US007987971B2

(12) United States Patent
Kimura et al.

(10) Patent No.: US 7,987,971 B2
(45) Date of Patent: Aug. 2, 2011

(54) BELT DEVICE AND FIXING DEVICE

(75) Inventors: Kouichi Kimura, Kanagawa (JP); Takanori Sasaki, Kanagawa (JP); Toshinori Sasaki, Kanagawa (JP); Masakazu Takahashi, Kanagawa (JP); Shogo Kamiya, Kanagawa (JP); Yasunori Fujimoto, Kanagawa (JP); Masataka Konishi, Kanagawa (JP); Hitoshi Hamasaki, Kanagawa (JP); Keita Yano, Kanagawa (JP); Akira Fukuchi, Kanagawa (JP); Satoshi Matsuzaka, Kanagawa (JP); Masakatsu Eda, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 35 days.

(21) Appl. No.: 12/554,230

(22) Filed: Sep. 4, 2009

(65) Prior Publication Data

US 2010/0230248 A1 Sep. 16, 2010

(30) Foreign Application Priority Data

Nov. 17, 2008 (JP) ................................ P2008-293772

(51) Int. Cl.
*B65G 43/00* (2006.01)

(52) U.S. Cl. .................................................. 198/810.03

(58) Field of Classification Search ............. 198/810.03, 198/806, 807
See application file for complete search history.

(56) References Cited

U.S. PATENT DOCUMENTS

| | | | | |
|---|---|---|---|---|
| 3,513,966 | A * | 5/1970 | Eckels | 198/810.03 |
| 5,347,348 | A * | 9/1994 | Nagata | 198/810.03 |
| 5,964,339 | A * | 10/1999 | Matsuura et al. | 198/810.03 |
| 6,237,752 | B1 * | 5/2001 | El-Ibiary | 198/810.03 |
| 6,594,460 | B1 * | 7/2003 | Williams et al. | 198/810.03 |
| 6,776,280 | B2 * | 8/2004 | Hovstø et al. | 198/806 |
| 6,852,050 | B2 * | 2/2005 | Sands et al. | 198/810.03 |
| 7,293,641 | B2 * | 11/2007 | Toya et al. | 198/810.03 |
| 7,686,158 | B2 * | 3/2010 | Tao et al. | 198/807 |

FOREIGN PATENT DOCUMENTS

| | | |
|---|---|---|
| JP | 4-350685 | 12/1992 |
| JP | 2000-066541 | 3/2000 |
| JP | 2000-327162 | 11/2000 |
| JP | 2005-316165 | 11/2005 |

* cited by examiner

*Primary Examiner* — James R Bidwell
(74) *Attorney, Agent, or Firm* — Morgan, Lewis & Bockius LLP

(57) ABSTRACT

A belt device includes a belt; a driving unit that is provided inside the belt and drives the belt; a supporting unit that is provided inside the belt and supports the belt; and a position determination member that is fixed to one end in an axial direction of the driving unit or the supporting unit and comes in contact with an edge portion of the belt in the case where the belt is mounted so as to determine a position of the belt.

4 Claims, 8 Drawing Sheets

BELT DEVICE AND FIXING DEVICE

CROSS-REFERENCE TO RELATED APPLICATION

This application is based on and claims priority under 35 USC 119 from Japanese Patent Application No. 2008-293772 filed on Nov. 17, 2008.

BACKGROUND

Technical Field

The present invention relates to a belt device and a fixing device.

SUMMARY

According to an aspect of the invention, a belt device includes a belt; a driving unit that is provided inside the belt and drives the belt; a supporting unit that is provided inside the belt and supports the belt; and a position determination member that is fixed to one end in an axial direction of the driving unit or the supporting unit and comes in contact with an edge portion of the belt in the case where the belt is mounted so as to determine a position of the belt.

BRIEF DESCRIPTION OF THE DRAWINGS

Exemplary embodiments of the invention will be described in detail based on the following figures, wherein.

DETAILED DESCRIPTION

Figure 1:
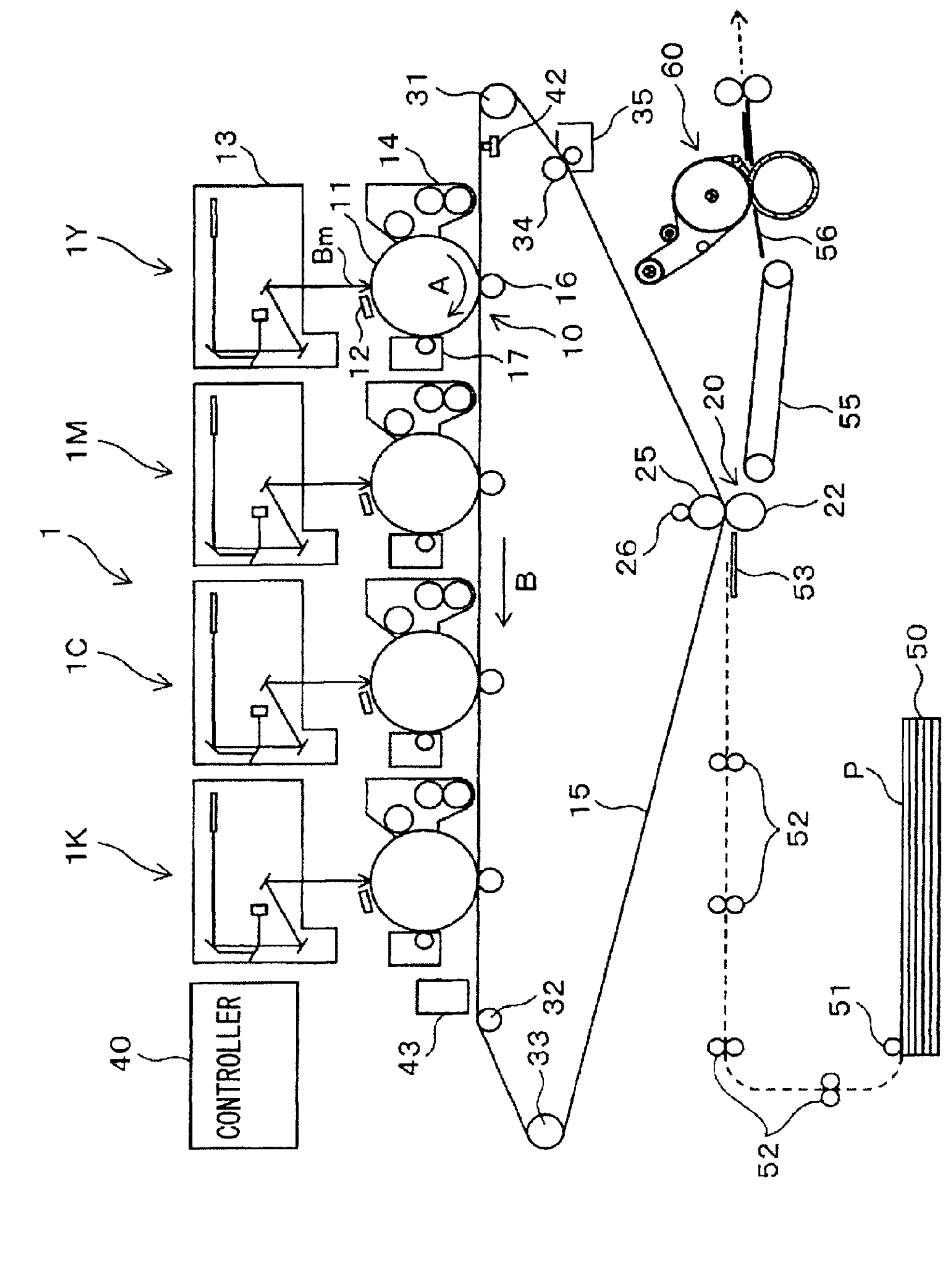
FIG. 1 is a view schematically illustrating the configuration of an image forming apparatus.
Figure 2:
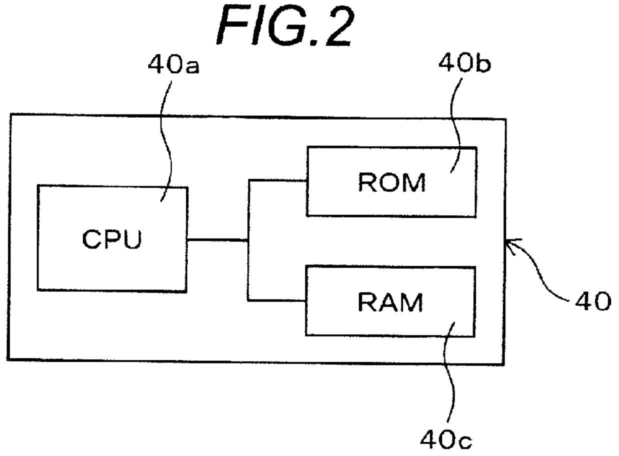
FIG. 2 is a block diagram schematically illustrating a controller.

Hereinafter, an exemplary embodiment of the invention will be described with reference to the accompanying drawings. FIG. 1 is a view schematically illustrating the configuration of an image forming apparatus. FIG. 2 is a block diagram schematically illustrating a controller.

(Configuration of Image Forming Apparatus)

The image forming apparatus 1 includes, as illustrated in FIG. 1, plural image forming units 1Y, 1M, 1C, and 1K for forming toner images in respective color components, a primary transfer unit 10 for primarily transferring on an intermediate transfer belt 15 the toner images of the color components formed by the image forming units 1Y, 1M, 1C, and 1K, a secondary transfer unit 20 for secondarily transferring to a recording medium P the primary transfer image transferred on the intermediate transfer belt 15, and a fixing device

60 for fixing the secondary transfer image on the recording medium P. In addition, a controller 40 is included for controlling the entire operations of the image forming apparatus 1.

The controller 40 includes, as illustrated in FIG. 2, a CPU (Central Processing Unit) 40*a*, a ROM (Read Only Memory) 40*b*, and a RAM (Random Access Memory) 40*c*. The controller 40 controls the entire operations of the image forming apparatus 1 including the operations of the fixing device 60.

The CPU 40*a* controls the entire operations of the image forming apparatus 1 including the operations of the fixing device 60 and has functions for executing the operations described later. The ROM 40*b* stores programs for executing the entire operations of the image forming apparatus 1 and data needed for the operations.

The RAM 40*c* functions as a work area temporarily storing program data or various types of data during the execution of the operation order described later, and a memory for storing various types of data obtained in the operations described later. The RAM 40*c* may include a non-volatile memory and maintains necessary data when the power is turned off.

In each of the image forming units 1Y, 1M, 1C, and 1K, around a photoreceptor drum 11 which rotates in an arrow direction A in FIG. 1, electrophotographic devices such as a charging unit 12 for charging the photoreceptor drum 11, a laser exposure unit 13 (an exposure beam in the figure is denoted by symbol Bm) which forms an electrostatic latent image on the photoreceptor drum 11, a developing unit 14 which contains toner of the corresponding color component used to visualize the electrostatic latent image on the photoreceptor drum 11 with the toner, a primary transfer roll 16 which transfers the toner image of the corresponding color component formed on the photoreceptor drum 11 to the intermediate transfer belt 15 of the primary transfer unit 10, and a drum cleaner 17 for removing residual toner on the photoreceptor drum 11 are provided in this order. The image forming units 1Y, 1M, 1C, and 1K are provided from the upper stream side of the intermediate transfer belt 15 in the order of yellow (Y), magenta (M), cyan (C), and black (K).

The intermediate transfer belt 15 is an endless belt which rotates in an arrow direction B in FIG. 1. The intermediate transfer belt 15 is rotated in the arrow direction B in FIG. 1 by various rolls at predetermined speed. As the various rolls, a drive roll 31 driven by a motor (not shown) for rotating the intermediate transfer belt 15, a support roll 32 for supporting the intermediate transfer belt 15, a tension roll 33 which applies tension to the intermediate transfer belt 15, a back-up roll 25 which is provided in the secondary transfer unit 20, and a cleaning back-up roll 34 which is provided in a cleaning unit for scraping off residual toner on the intermediate transfer belt 15.

The primary transfer unit 10 may be configured with the primary transfer roll 16 which is opposed to the photoreceptor drum 11 with the intermediate transfer belt 15 interposed therebetween, and the like. The primary transfer roll 16 is configured by a shaft (not shown) and a sponge layer used as an elastic layer provided around the shaft. The primary transfer roll 16 presses the photoreceptor drum 11 with the intermediate transfer belt 15 interposed therebetween.

A voltage of polarity opposite to the charge polarity of the toner is applied to the primary transfer belt 16. Accordingly, the toner images on the photoreceptor drums 11 are sequentially and electrostatically attracted by the intermediate transfer belt 15 so as to form a primary transfer image on the intermediate transfer belt 15.

The secondary transfer unit 20 is configured with a secondary transfer roll 22 which is disposed on a primary transfer image holding surface side of the intermediate transfer belt 15 and the back-up roll 25. The back-up roll 25 is disposed on a rear surface side of the intermediate transfer belt 15 to serve as a counter electrode of the secondary transfer roll 22 and comes in contact with a power supply roll 26 made of metal, to which a secondary transfer bias is applied.

The secondary transfer roll 22 includes a shaft (not shown) and a sponge layer used as an electric layer provided around the shaft. The secondary transfer roll 22 presses the back-up roll 25 with the intermediate transfer belt 15 interposed therebetween. The secondary transfer roll 22 is grounded to form a secondary transfer bias with the back-up roll 25 and secondarily transfers the primary transfer image on the transported recording medium P transported to the second transfer unit 20.

On the downstream side of the secondary transfer unit 20 in the rotation direction (the arrow direction B in FIG. 1) of the intermediate transfer belt 15, there is an intermediate transfer belt cleaner 35 for cleaning the surface of the intermediate transfer belt 15 by removing the residual toner or paper chips on the intermediate transfer belt 15 after being subjected to the secondary transfer. On the upstream side of the image forming unit 1Y in the rotation direction (the arrow direction B in FIG. 1) of the intermediate transfer belt 15, there is a reference sensor 42 which generates a reference signal that is the basis for image forming timing of each of the image forming units 1Y, 1M, 1C, and 1K.

The reference sensor 42 generates the reference signal by recognizing a mark provided on the rear side of the intermediate transfer belt 15. By a command from the controller 40 based on the recognition of the reference signal, each of the image forming units 1Y, 1M, 1C, and 1K starts image forming. On the downstream of the image forming unit 1K in the rotation direction (the arrow direction B in FIG. 1) of the intermediate transfer belt 15, an image density sensor 43 for adjusting image quality is provided.

In the image forming apparatus 1, as a sheet transport system, a sheet feeder 50 which accommodates the recording medium P, a pick-up roll 51 which takes the recording medium P loaded in the sheet feeder 50 out at a predetermined timing and transports it, a transport roll 52 which transports the recording medium P delivered by the pick-up roll 51, a transport chute 53 which sends the recording medium P transported by the transport roll 52 to the secondary transfer unit 20, a transport belt 55 which transports the recording medium P transported after being subjected to the secondary transfer by the secondary transfer roll 22 to the fixing device 60, and a fixing entrance guide 56 which guides the recording medium P to the fixing device 60.

Operation of Image Forming Apparatus

Next, an image forming process of the image forming apparatus 1 will be described with reference to the accompanying drawings. In the image forming apparatus 1, image data output from an image reading apparatus (not shown) or a PC (Personal Computer) (not shown) is subjected to image processing by an image processing device (not shown), and the image forming operation is performed thereon by the image forming units 1Y, 1M, 1C, and 1K. The image data subjected with the image processing is converted into color gradation data having four colors of Y, M, C, and K and output to the laser exposure unit 13.

The laser exposure unit 13 irradiates an exposure beam Bm emitted from, for example, a semiconductor laser on the photoreceptor drum 11 of each of the image forming units 1Y, 1M, 1C, and 1K, according to the input color gradation data. The photoreceptor drum 11 of each of the image forming units 1Y, 1M, 1C, and 1K is charged by the charging unit 12, and the surface thereof is irradiated and exposed by the laser exposure unit 13 to form an electrostatic latent image. The formed electrostatic latent images are developed into tone images of Y, M, C, and K colors by the developing units 14 of the image forming units 1Y, 1M, 1C, and 1K.

The toner images formed on the photoreceptor drums 11 of the image forming units 1Y, 1M, 1C, and 1K are transferred on the intermediate transfer belt 15 by the primary transfer unit 10 in which the photoreceptor drum 11 and the intermediate transfer belt 15 come in contact with each other. More specifically, in the primary transfer unit 10, a voltage of polarity opposite to the charge polarity of the toner is applied to a base member of the intermediate transfer belt 15 by the primary transfer roll 16, and the toner images are sequentially superimposed on the surface of the intermediate transfer belt 15 thereby performing primary transfer.

After primarily transferring the toner images sequentially on the surface of the intermediate transfer belt 15, the intermediate transfer belt 15 is moved such that the primary transfer image is transported to the secondary transfer unit 20. When the primary transfer image is transported to the secondary transfer unit 20, in the sheet transport system, the pick-up roll 51 is rotated at the same time at which the primary transfer image is transferred to the secondary transfer unit 20, so that the recording medium P is supplied from the sheet feeder 50.

The recording medium P supplied by the pick-up roll 51 is transported by the transport roll 52 to the secondary transfer unit 20 through the transport chute 53. Before being transported to the secondary transfer unit 20, the recording medium P is temporarily stopped, and a register roll (not shown) is rotated at the same time as the movement of the intermediate transfer belt 15 on which the primary transfer image is held such that the position of the recording medium P and the position of the primary transfer image are aligned.

In the secondary transfer unit 20, the secondary transfer roll 22 is pressed by the back-up roll 25 with the intermediate transfer belt 15 interposed therebetween. Here, the recording medium P transported at the corresponding timing is pinched between the intermediate belt 15 and the secondary transfer roll 22. At this time, when a voltage of the same polarity as the charge polarity of the toner is applied from the power supply roll 26, a transfer electric field is formed between the secondary transfer roll 22 and the back-up roll 25. In addition, the primary transfer image held on the intermediate transfer belt 15 is electrostatically transferred on the recording medium P in the secondary transfer unit 20 which is pressed by the secondary transfer roll 22 and the back-up roll 25.

Thereafter, the recording medium P on which the primary transfer image is electrostatically transferred is transported by the secondary transfer roll 22 in a state where it is peeled from the intermediate transfer belt 15, to the transport belt 55 provided on the downstream side of the secondary transfer roll 22 in the transport direction of the recording medium P. The transport belt 55 transports the recording medium P to the fixing device 60 at a predetermined transport speed corresponding to the fixing speed of the fixing device 60.

The secondary transfer image, which is not fixed yet on the recording medium P transported to the fixing device 60, is subjected to fixing processing such as heating and pressing by the fixing device 60 so as to be fixed on the recording medium P. In addition, the recording medium P on which the image is fixed is transported to a discharge unit (not shown) of the image forming apparatus 1. After terminating the transfer to the recording medium P, the residual toner on the intermediate transfer belt 15 is transported as the intermediate transfer belt 15 is rotated and removed from the intermediate transfer belt 15 by the cleaning back-up roll 34 and the intermediate transfer belt cleaner 35.

(Configuration of Fixing Device)

Figure 3:
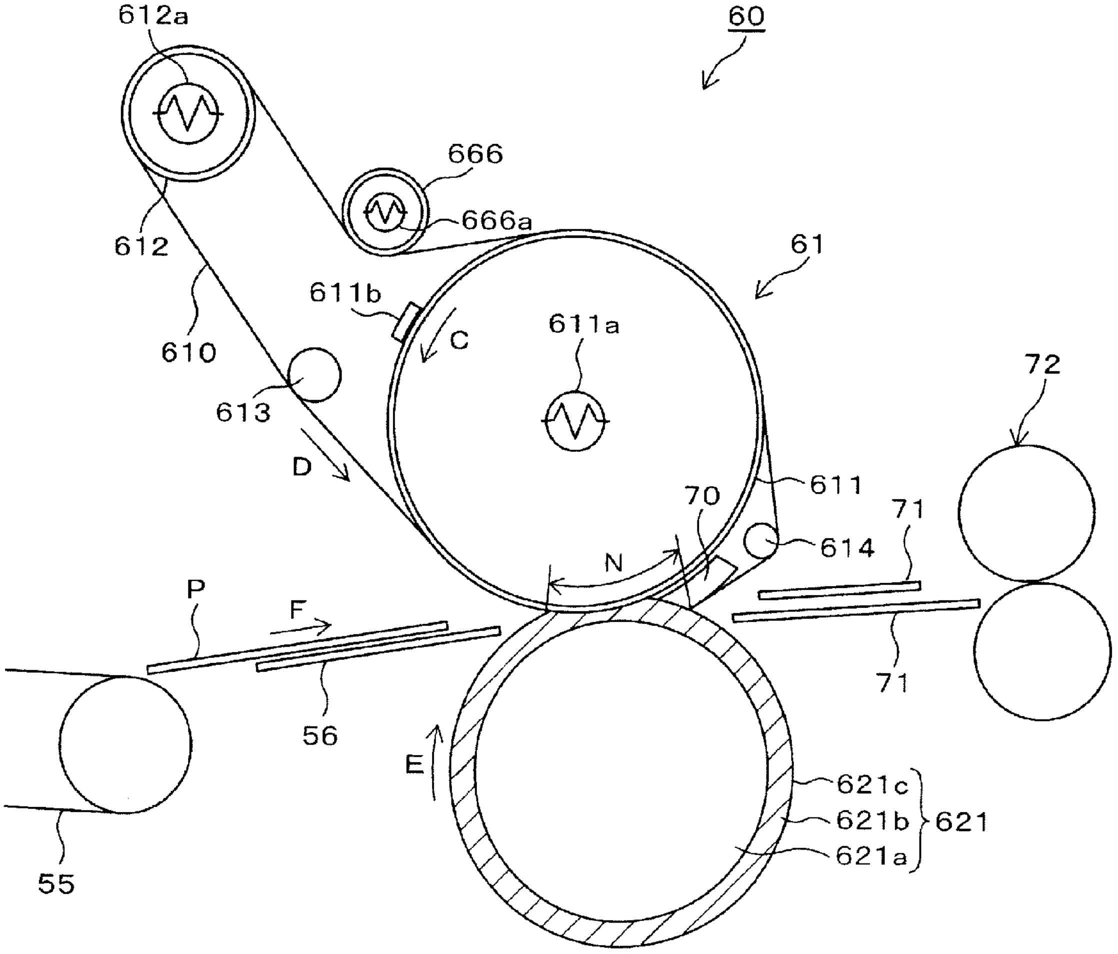
FIG. 3 is a view schematically illustrating the configuration of a fixing device.
Figure 4:
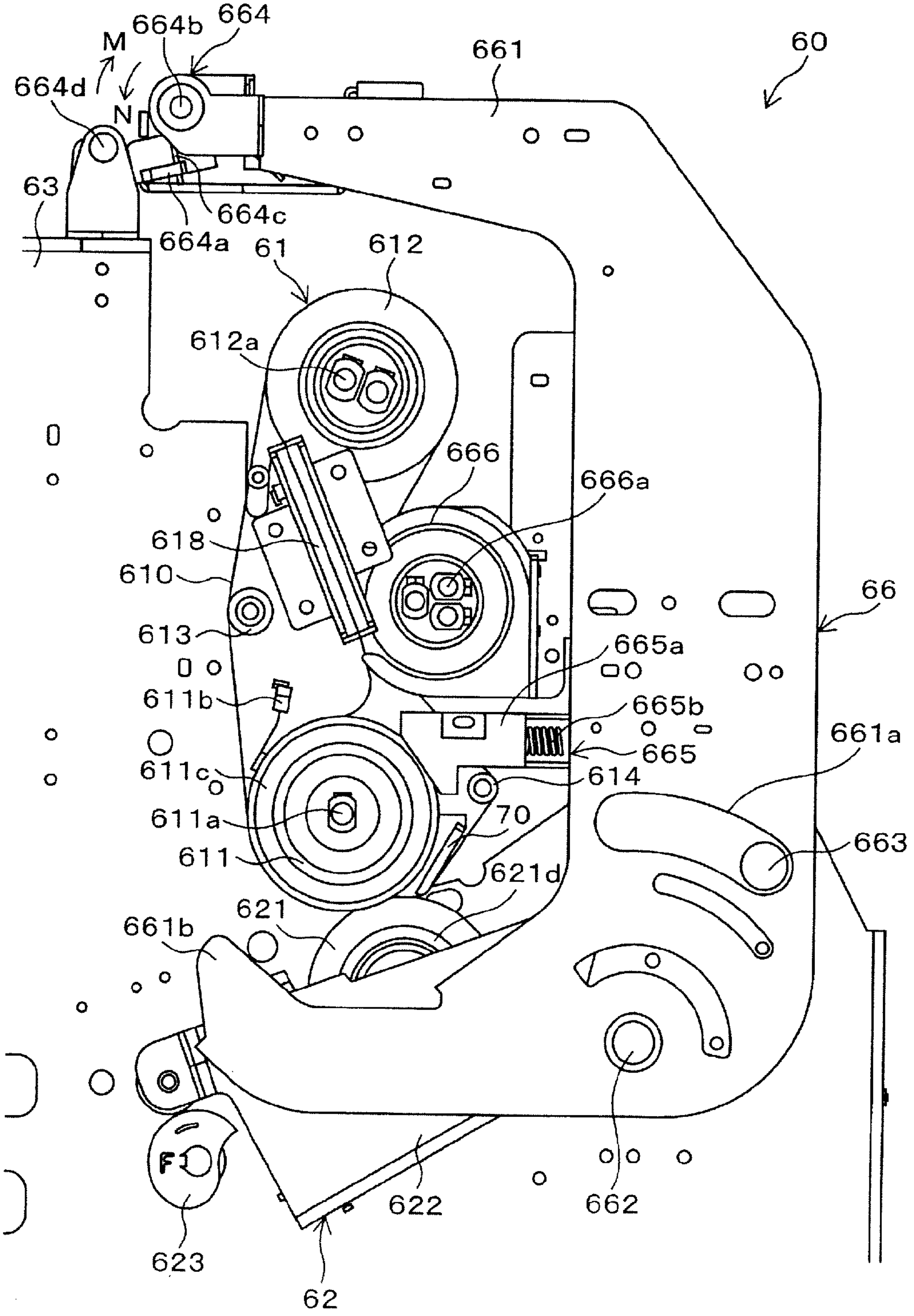
FIG. 4 is a view illustrating a state where an opening and closing frame is closed.
Figure 5:
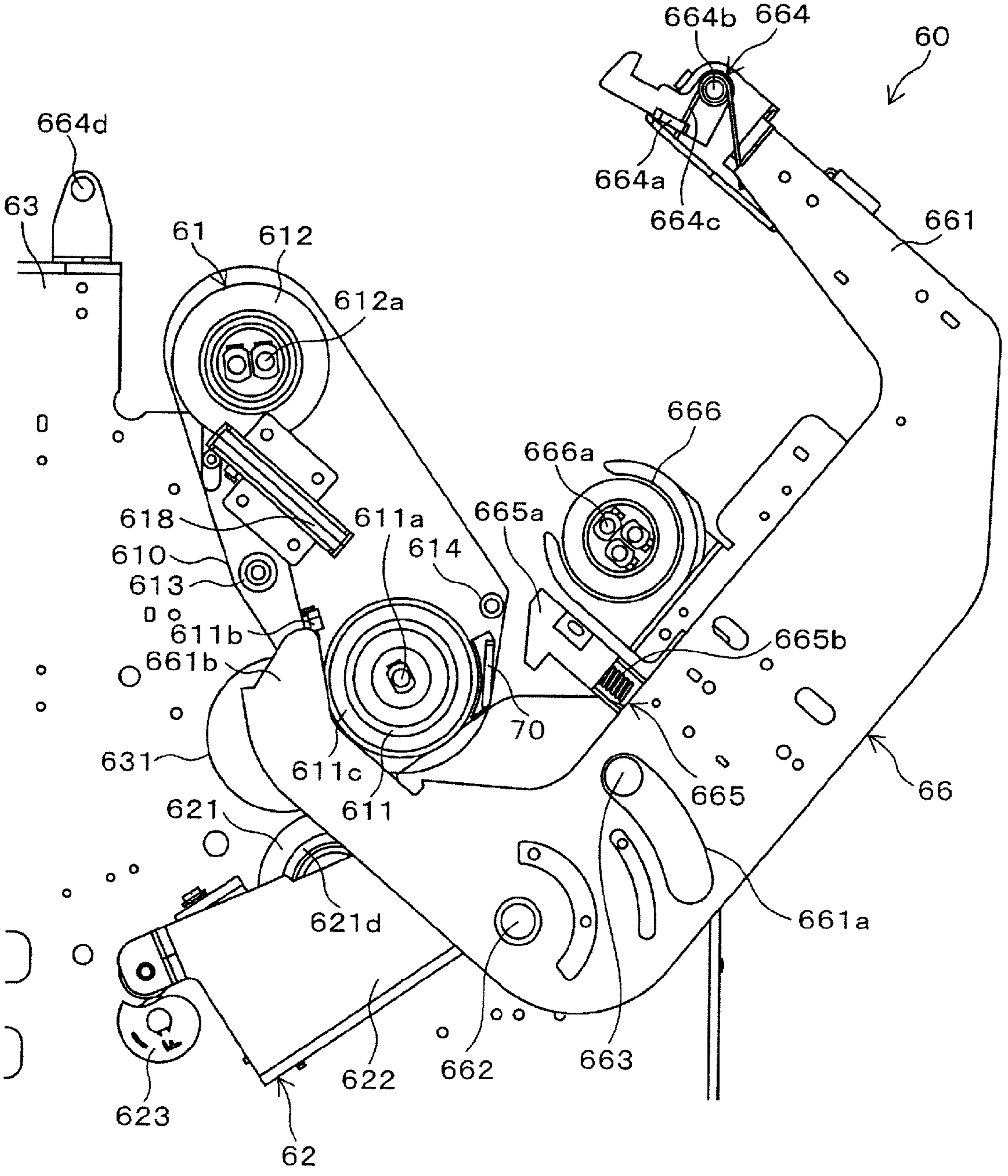
FIG. 5 is a view illustrating a state where the opening and closing frame is opened.
Figure 6:
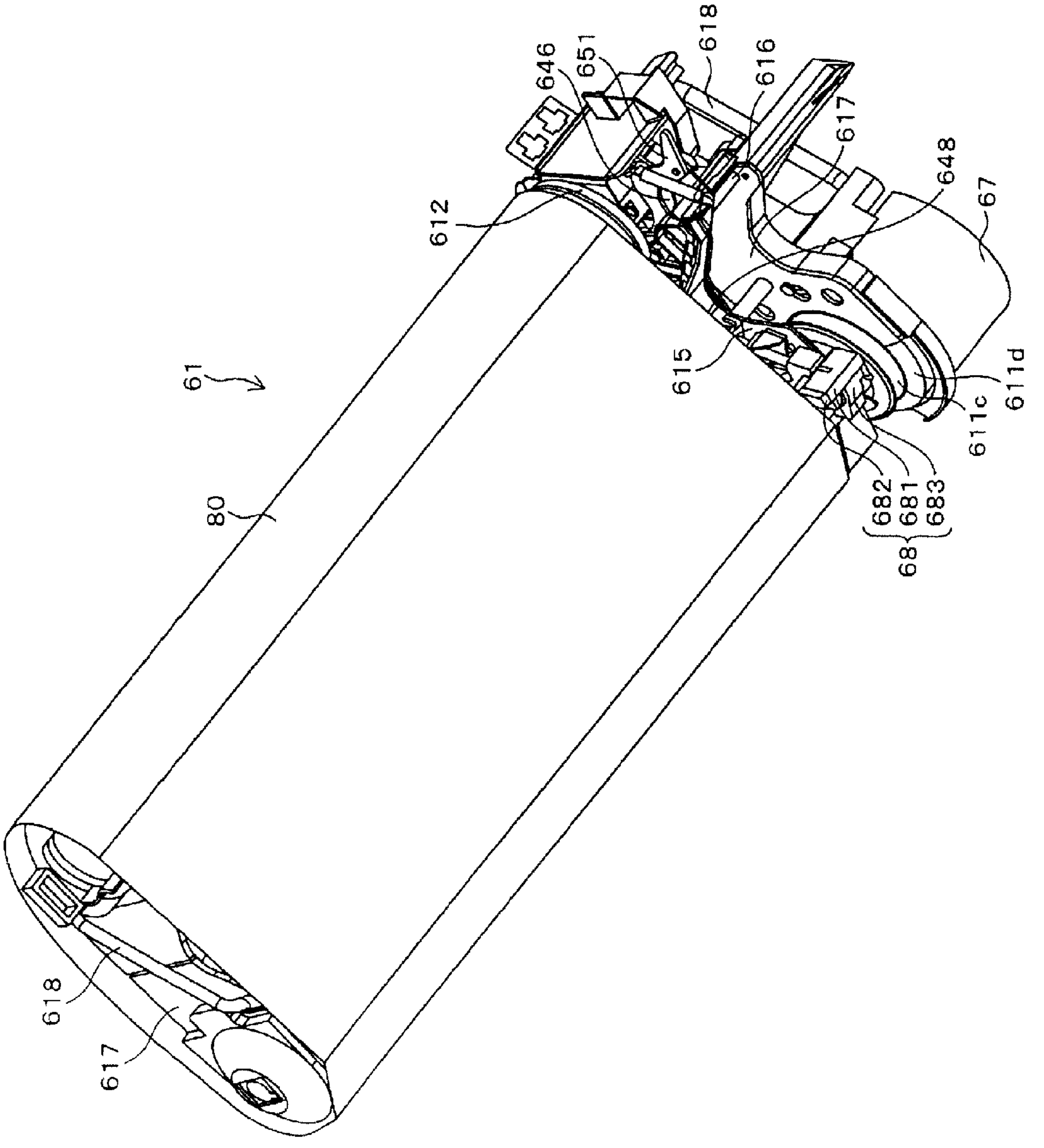
FIG. 6 is a perspective view illustrating a fixing belt module.
Figure 7:
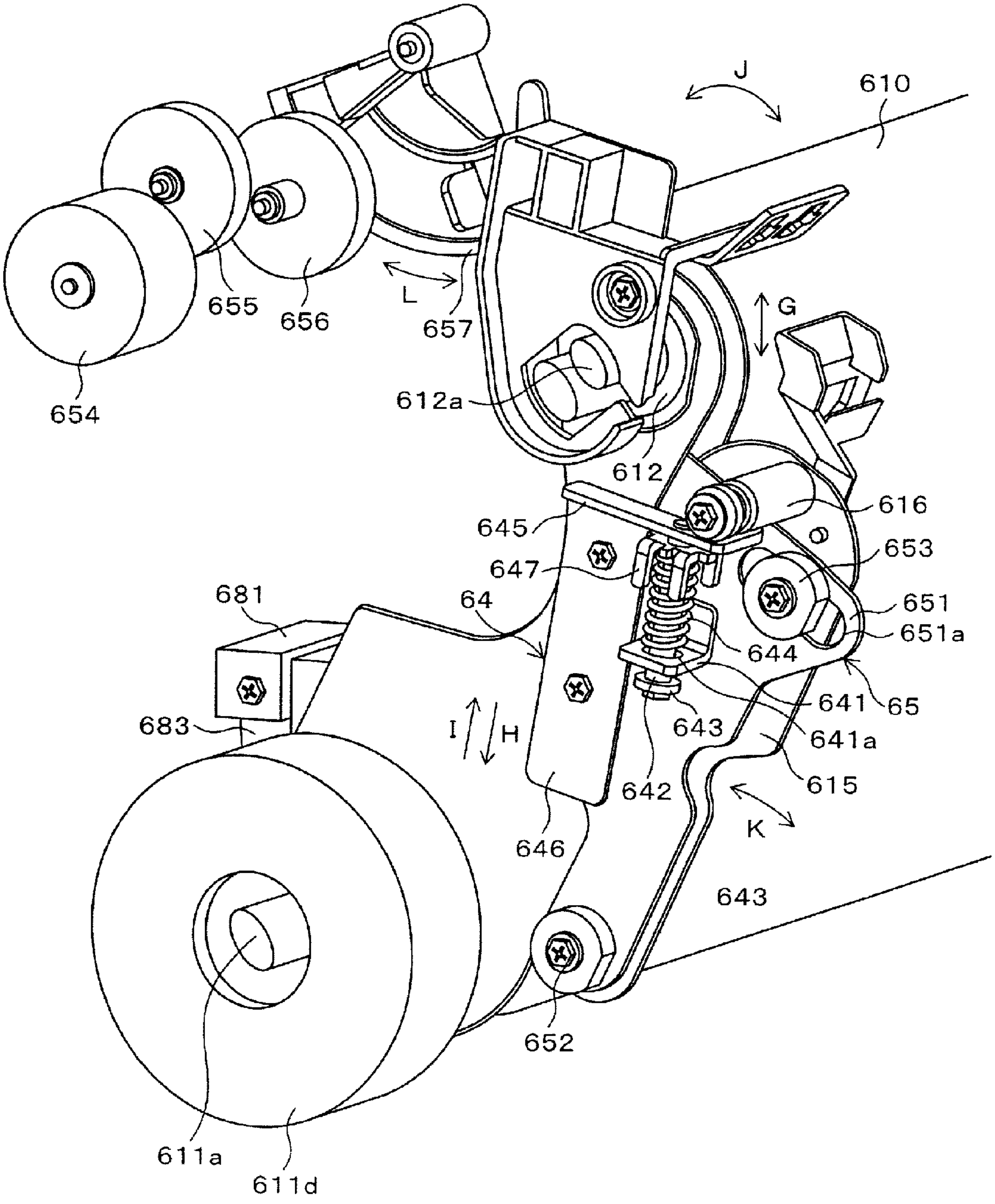
FIG. 7 is a perspective view illustrating a tension mechanism and a meandering prevention mechanism.
Figure 8:
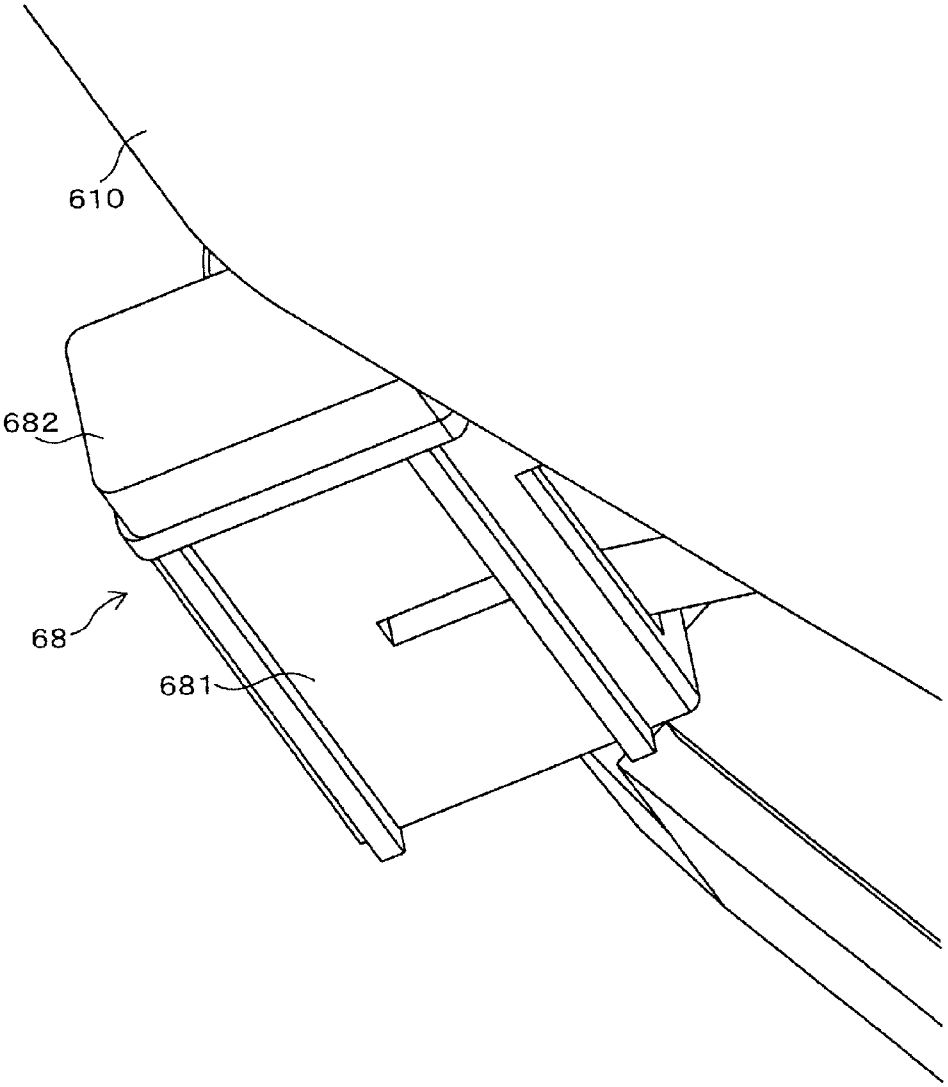
FIG. 8 is a perspective view illustrating a state where a fixing belt is replaced.
Figure 9:
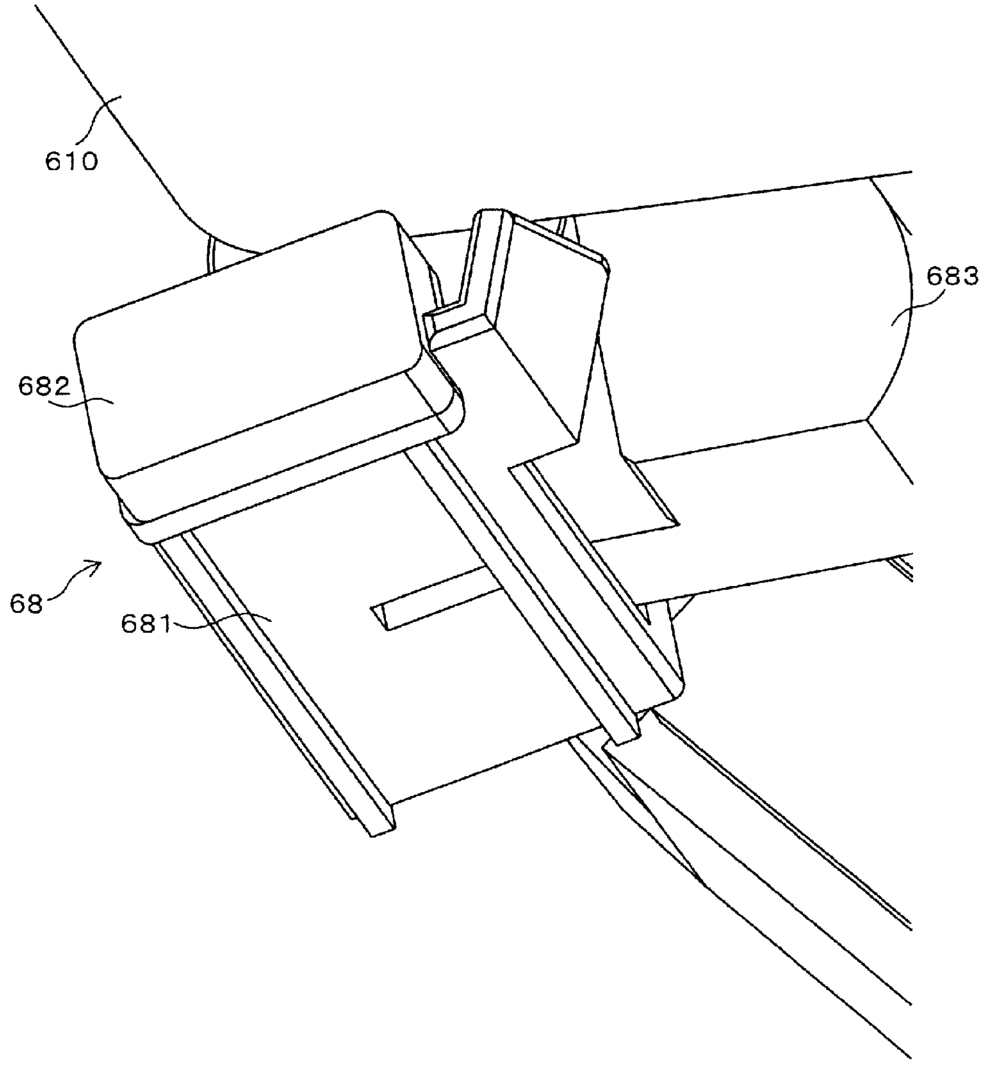
FIG. 9 is a perspective view illustrating the fixing belt in a state where the fixing belt module is mounted.

Next, the configuration of the fixing device 60 will be described with reference to the accompanying drawings. FIG. 3 is a view schematically illustrating the configuration of the fixing device. FIG. 4 is a view illustrating a state where an opening and closing frame is closed. FIG. 5 is a view illustrating a state where the opening and closing frame is opened. FIG. 6 is a perspective view illustrating a fixing belt module. FIG. 7 is a perspective view illustrating a tension mechanism and a meandering prevention mechanism. FIG. 8 is a perspective view illustrating a state where a fixing belt is replaced. FIG. 9 is a perspective view illustrating the fixing belt in a state where the fixing belt module is mounted.

The fixing device 60 includes the fixing belt module 61 as a belt device, a pressure mechanism 62 as a pressure unit, a supporting frame 63 as a supporting member, the meandering prevention mechanism 65 as a position adjustment unit, and an opening and closing mechanism 66 as an opening and closing unit. In addition, the fixing device 60 includes a longitudinal placement member 67 as a placement member and a belt position determination member 68 as a position determination member.

The fixing belt module 61 includes, as illustrated in FIG. 3, a fixing belt 610 as a belt, a fixing roll 611 as a driving unit, an extension roll 612 as a supporting unit, a positioning correction roll 613, a peeling pad 70, and an extension roll 614. In addition, the fixing belt module 61 includes, as illustrated in FIGS. 6 and 7, an inner plate 615, a shaft 616, and an outer plate 617, and a handle 618. The fixing belt module 61 is also provided with the tension mechanism 64 as a tension adjustment unit.

The fixing belt 610 is an endless belt and configured as a multi-layer structure constituted by a base layer made of polyimide resin, an elastic layer made of silicone rubber laminated on a surface (outer peripheral surface) of the base layer or the like, and as a release layer additionally formed on the elastic layer, where the release layer made of a tetrafluoroethylene/perfluoro (alkyl vinyl ether) copolymer (PFA) tube or the like.

The fixing roll 611 is provided inside the fixing belt 610. The fixing roll 611 is a cylindrical roll made of aluminum or the like. The fixing roll 611 is provided with, as illustrated in FIGS. 6 and 7, a bearing 611*c*, and a gear 611*d* engaged with a gear of a driving motor (not shown). The fixing roll 611 receives a driving force from a driving motor (not shown) so as to be rotated in an arrow direction C in FIG. 3 at a predetermined surface speed. As the fixing roll 611 is rotated in the arrow direction C in FIG. 3, the fixing belt 610 is rotated in an arrow direction D in FIG. 3.

A halogen heater 611*a* as a heat source is provided in the fixing roll 611, and on the basis of measurement values of a temperature sensor 611*b* disposed to be in contact with the surface of the fixing roll 611, the controller 40 of the image forming apparatus 1 controls the surface temperature of the fixing roll 611 to be at a predetermined temperature.

The extension roll 612 is provided inside the fixing belt 610. The extension roll 612 is a cylindrical roll made of aluminum or the like. A halogen heater 612*a* as a heat source is provided in the extension roll 612, and the surface temperature of the extension roll 612 is controlled at a predetermined temperature by a temperature sensor (not shown) and the controller 40. The extension roll 612 supports the fixing belt 610 from the inside of the fixing belt 610. In addition, the extension roll 612 heats the fixing belt 610.

In this exemplary embodiment, the extension roll 612 also serves as a meandering control roll for controlling the meandering of the fixing belt 610. A shaft displacement mechanism for displacing the contact position of the fixing belt 610 in an axial direction, on the basis of the detection result of an edge position detection mechanism (not shown) used for detecting an edge position of the fixing belt 610, is provided to control the meandering of the fixing belt 610. As the shaft displacement mechanism, the meandering prevention mechanism 65 is provided which inclines the shaft center of the extension roll 612. In addition, the roll for controlling the meandering of the fixing belt 610 is not limited to the extension roll 612, and any roll can be employed as along as the roll comes in contact with the fixing belt 610.

The positioning correction roll 613 is a cylindrical roll made of aluminum or the like. It is provided such that when the shaft center of the extension roll 612 is inclined to control the meandering of the fixing belt 610, and the effect is not applied on other parts.

The peeling pad 70 is formed as a rigid body made of metal, resin, or the like, and is formed into a block member having an arc cross-section. The peeling pad 70 is fixed to the entire region in the axial direction of the fixing roll 611 at a position on the downstream side of a region where the pressure roll 621 described later presses the fixing roll 611 with the fixing belt 610 interposed therebetween. The peeling pad 70 is provided to press a predetermined width region of the pressure roll 621 described later with the fixing belt 610 interposed therebetween.

The extension roll 614 is a cylindrical roll made of aluminum or the like. The extension roll 614 is disposed on the downstream side of the peeling pad 70 in the rotation direction (in the arrow direction D in FIG. 3) of the fixing belt 610 so as to enable the fixing belt 610 passing the peeling pad 70 to be properly rotated toward the fixing roll 611. The extension roll 614 applies tension to the fixing belt 610 on the downstream side of the contact portion N in the transport direction (in an arrow direction F in FIG. 3) of the recording medium P.

The inner plate 615 is, as illustrated in FIGS. 6 and 7, provided on both sides of the fixing roll 611 in the axial direction of the fixing roll 611 on the inner side from the outer plate 617. The shaft 616 connects the inner plate 615 to the outer plate 617. The outer plate 617 is provided on the both sides of the fixing roll 611 in the axial direction of the fixing roll 611 on the outer side from the inner plate 615. The handle 618 is provided on the outer side from the outer plate 617 on both sides. The handle 618 is a member which is held by an operator to help move the fixing belt module 61.

The pressure mechanism 62 includes, as illustrated in FIGS. 3 to 5, the pressure roll 621, a pressure bracket 622, and a cam 623. The pressure roll 621 uses a columnar roll 621*a* made of aluminum or the like as a base member and is constituted by sequentially laminating an elastic layer 621*b* made of silicone rubber or the like and a release layer 621*c* made of a PFA tube or the like from the base member. The pressure roll 621 is provided with a bearing 621*d*. One end of the pressure bracket 622 is rotatably supported by the supporting frame 63, and the other end thereof comes in contact with the cam 623. The pressure bracket 622 supports the pressure roll 621 with the bearing 621*d* interposed therebetween. The cam 623 is controlled by the controller 40 and rotated by a motor (not shown) in a predetermined case.

In the pressure mechanism 62, in the case where the opening and closing mechanism 66 is closed as illustrated in FIG. 4, the pressure roll 621 presses the fixing roll 611 with the fixing belt 610 interposed therebetween. As the fixing belt

610 is rotated in the arrow direction D in FIG. 3, the pressure roll 621 is rotated in an arrow direction E in FIG. 3. On the other hand, in the case where the opening and closing mechanism 66 is opened as illustrated in FIG. 5, in the pressure mechanism 62, the pressure roll 621 is separated from the fixing roll 611. Accordingly, when the fixing belt module 61 is attached to or detached from the fixing device 60, the pressure roll 621 retreats, thereby preventing damage to the fixing belt module 61 and the pressure mechanism 62.

As cases where the pressure roll 621 presses the fixing roll 611 correspond to at least the case where the fixing device 60 performs a fixing operation. On the other hand, as cases where the pressure roll 621 is separated from the fixing roll 611 correspond to the case where the fixing belt module 61 is attached to or detached from the fixing device 60, the case where the image forming apparatus 1 is turned off, the case where a replacement mode for replacing the fixing belt 610 is provided and the replacement mode is set, and the like.

The supporting frame 63 is provided on both sides of the fixing belt module 61 in the longitudinal direction of the fixing belt module 61. The supporting frame 63 is, as illustrated in FIG. 5, provided with a notch 631 for supporting the fixing roll 611 with the bearing 611*c* of the fixing roll 611 interposed therebetween. In addition, the supporting frame 63 is provided with a concave portion (not shown) for supporting the fixing belt module 61 with the shaft 616 interposed therebetween. That is, the supporting frame 63 supports the fixing belt module 61 by supporting the bearing 611*c* with the notch 631 and the shaft 616 with the concave portion (not shown).

The tension mechanism 64 includes, as illustrated in FIGS. 6 and 7, an L-shaped member 641, a bar member 642, a disc member 643, a tension spring 644, a bracket 645, a tension bracket 646 as a supporting member, a restriction member 647, and a slide rail 648. The tension mechanism 64 moves the extension roll 612 of the fixing belt module 61 in an arrow direction G in FIG. 7 to adjust tension of the fixing belt 610.

One surface of the L-shaped member 641 is in contact with and fixed to a steering lever 651 described later. The other surface of the L-shaped member 641 is provided with a hole 641*a*. The bar member 642 penetrates through the hole 641*a* of the L-shaped member 641. One end of the bar member 642 is provided with the disc member 643. The other end of the bar member 642 is fixed to the bracket 645. The bar member 642 is provided with the tension spring 644 and the restriction member 647 in this order from the L-shaped member 641 toward the bracket 645. The bracket 645 is welded and fixed to the tension bracket 646. The tension bracket 646 supports the extension roll 612. The tension bracket 646 is provided with the slide rail 648.

In the tension mechanism 64, when tension is applied to the fixing belt 610, the extension roll 612 is moved downward in the arrow direction G in FIG. 7 such that the tension bracket 646 and the bracket 645 are moved (in an arrow direction H in FIG. 7) toward the fixing roll 611 from the extension roll 612 along the slide rail 648. Thus, the tension spring 644 is compressed by the bracket 645 with the restriction member 647 interposed therebetween, thereby adjusting the tension of the fixing belt 610.

Accordingly, when the fixing belt 610 is replaced, it is possible to prevent the tension bracket 646 from coming in contact with the fixing belt 610, thereby preventing breakage of the fixing belt 610. In addition, even when a mechanism for adjusting the tension of the fixing belt 610 is not provided for the member used for applying tension to the fixing belt 610, the tension of the fixing belt 610 can be adjusted. In addition, when the tension of the fixing belt 610 is adjusted, the restriction member 647 comes in contact with the L-shaped member 641, so that the movement range of the tension bracket 646 is restricted to a predetermined range.

In the tension mechanism 64, when the tension of the fixing belt 610 is loosened, the extension roll 612 is moved upward in the arrow direction G in FIG. 7 by the operation of the tension spring 644, and thus the tension bracket 646 and the bracket 645 are moved from the fixing roll 611 toward the extension 612 (an arrow direction I in FIG. 7).

When the tension bracket 646 and the bracket 645 are moved, the disc member 643 comes in contact with the L-shaped member 641, so that the movement of the tension bracket 646 and the extension roll 612 is restricted to a predetermined range. That is, the disc member 643 and the L-shaped member 641 serve as movement restriction members for restricting the movement range of the extension roll 612. Accordingly, the tension mechanism 64 is in a state where it does not adjust the tension of the fixing belt 610. That is, tension is not exerted on the fixing belt 610. As a result, when the fixing belt 610 is replaced, it is possible to prevent the fixing belt 610 from contacting the fixing roll 611 and the extension roll 612, so that the fixing belt 610 can be relatively easily replaced.

The meandering prevention mechanism 65 includes, as illustrated in FIGS. 6 and 7, the steering lever 651, a shaft 652, a stopper 653, a steering motor 654, a first gear 655, a second gear 656, and a steering cam 657. In the meandering prevention mechanism 65, one end portion of the extension roll 612 of the fixing belt module 61 is moved in a predetermined direction (in an arrow direction J in FIG. 7), and thus the fixing belt 610 of the fixing belt module 61 is moved to a predetermined position, thereby preventing the meandering of the fixing belt 610.

The steering lever 651 is rotatably supported by the inner plate 615 with the shaft 652 interposed therebetween. The steering lever 651 is rotated in an arrow direction K in FIG. 7 with the shaft 652 as a fulcrum. The steering lever 651 is provided with a slit 651*a*. The stopper 653 is provided in the inner plate 615 so as to penetrate through the slit 651*a*. The stopper 653 restricts the rotation range of the steering lever 651. The steering motor 654 rotates the steering cam 657 in an arrow direction L in FIG. 7 with the first gear 655 and the second gear 656 interposed therebetween. The steering cam 657 comes in contact with the steering lever 651.

In the meandering prevention mechanism 65, when the steering cam 657 is moved in the arrow direction L in FIG. 7 by the driving force of the steering motor 654, the steering lever 651 is moved in the arrow direction K in FIG. 7 along with the movement of the steering cam 657, and one end of the extension roll 612 is moved in a predetermined direction (in an arrow direction J in FIG. 7) with the tension mechanism 64 interposed therebetween. Accordingly, after replacing the fixing belt 610, the fixing belt 610 can be moved to a predetermined position.

The opening and closing mechanism 66 includes, as illustrated in FIGS. 4 and 5, an opening and closing frame 661, a shaft 662, a stopper 663, a lock mechanism 664, a maintaining mechanism 665, and an extension roll 666 as a tension applying unit. When the opening and closing mechanism 66 is opened by the operator, it is possible to detach the fixing belt module 61 from the supporting frame 63. On the other hand, when the opening and closing mechanism 66 is closed by the operator, the fixing belt module 61 is mounted to the fixing device 60. Accordingly, the fixing belt module 61 can be easily attached and detached.

The opening and closing frame 661 has a U shape. The opening and closing frame 661 is rotatably supported by the supporting frame 63 with the shaft 662 interposed therebetween. The opening and closing frame 661 is rotated to be opened from the state in FIG. 4 to the state in FIG. 5 with the shaft 662 as a fulcrum, and is rotated to be closed from the state in FIG. 5 to the state in FIG. 4. The opening and closing frame 661 is provided with a slit 661*a* and a pulling portion 661*b* as a pulling member. The stopper 663 is provided in the supporting frame 63 so as to pass through the slit 661*a*. The stopper 663 restricts a rotation movement of the opening and closing frame 661. In addition, the opening and closing frame 661 is provided with a pushing member which comes in contact with the bearing 611*c* of the fixing roll 611 for fitting the bearing 611*c* into the notch 631 when the opening and closing frame 661 is closed.

When the opening and closing frame 661 is opened, the pulling portion 661*b* comes in contact with the bearing 611*c* of the fixing roll 611 to detach the fixing roll 611 of the fixing belt module 61 from the notch 631 of the supporting frame 63 so as to be pulled toward the opening and closing frame 661. Accordingly, the fixing belt module 61 is moved from the position at which it is mounted to the fixing device 60 toward the operator, so that the fixing belt module 61 can be relatively easily detached from the fixing device 60.

The lock mechanism 664 is provided on the opposite side to the side on which the pulling portion 661*b* of the opening and closing frame 661 is provided. The lock mechanism 664 includes a hooking portion 664*a*, a shaft 664*b*, a spring 664*c*, and a hooked portion 664*d*. The hooking portion 664*a* is rotatably supported by the opening and closing frame 661 with the shaft 664*b* interposed therebetween. The hooking portion 664*a* is rotated in a clockwise direction (in an arrow direction M) in FIG. 4 on the shaft 664*b* as a fulcrum and in a counterclockwise direction (in an arrow direction N). The spring 664*c* is provided around the shaft 664*b*. The spring 664*c* pushes the hooking portion 664*a* in the clockwise direction (in the arrow direction M) in FIG. 4. The hooked portion 664*d* is provided in the supporting frame 63. The hooking portion 664*a* hooks hooked portion 664*d*.

In the lock mechanism 664, when the hooking portion 664*a* is pushed in the counterclockwise direction (in the arrow direction N) from the state in FIG. 4 by the operator, the hooking portion 664*a* is released from the state where it hooks the hooked portion 664*d*. As described above, when the lock mechanism 664 is released, it becomes possible to open the opening and closing frame 661. On the other hand, in the lock mechanism 664, when the opening and closing frame 661 is closed by the operator from the state in FIG. 5, the hooked portion 664*d* is hooked by the hooking portion 664*a*, and the opening and closing frame 661 is maintained in the closed state by the operation of the spring 664*c*.

The maintaining mechanism 665 is provided in a side surface of the opening and closing frame 661. That is, as illustrated in FIG. 4, the maintaining mechanism 665 is provided at a position opposed to the bearing 611*c* of the fixing roll 611 in the state where the opening and closing frame 661 is closed. The maintaining mechanism 665 includes a contact portion 665*a* and a spring 665*b*. In the maintaining mechanism 665, when the opening and closing frame 661 is closed as illustrated in FIG. 4, the contact portion 665*a* presses the bearing 611*c* by the operation of the spring 665*b* such that the bearing 611*c* maintains the state where it is fitted into the notch 631.

The extension roll 666 is provided in the side surface of the opening and closing frame 661. That is, as illustrated in FIG. 4, in the state where the opening and closing frame 661 is closed, the extension roll 666 is provided at a position opposed to the fixing belt 610 between the fixing roll 611 and the extension roll 612. The extension roll 666 is a cylindrical roll made of aluminum or the like. A halogen heater 666*a* as a heat source is provided in the extension roll 666, so that the surface temperature of the extension roll 666 is controlled at a predetermined temperature by a temperature sensor (not shown) and the controller 40.

The extension roll 666 heats the fixing belt 610. In addition, when the opening and closing frame 661 is closed, the extension roll 666 applies tension to the fixing belt 610 from the outside of the fixing belt 610, and when the opening and closing frame 661 is opened, it allows the tension of the fixing belt 610 to be loosened. Accordingly, in the case of replacing the fixing belt 610, tension is not applied to the fixing belt 610, so that the fixing belt 610 can be easily replaced.

The longitudinal placement member 67 is, as illustrated in FIG. 6, provided on the side on which the belt position determination member 68 is provided, in the longitudinal direction of the fixing belt module 61. Specifically, the longitudinal placement member 67 is provided at an outer side surface of the outer plate 617 in the axial direction of the fixing roll 611. When the longitudinal placement member 67 is a member configured such that when the fixing belt module 61 is detached from the fixing device 60, the fixing belt module 61 is placed lengthwise on a flat part such as floor so as to align the axial directions of the fixing roll 611 and the extension roll 612 with the direction of gravity. Accordingly, for example, the fixing belt 610 can be held by both hands of the operator, so that the fixing belt 610 can be relatively easily replaced.

The belt position determination member 68 is, as illustrated in FIGS. 6, 8, and 9, fixed to one end in the axial direction of the fixing roll 611 or the extension roll 612. Specifically, the belt position determination member 68 is provided in the inner plate 615 at one side in the axial direction of the fixing roll 611. The belt position determination member 68 does not come in contact with the fixing belt 610 when the fixing belt module 61 is mounted to the fixing device 60 as illustrated in FIG. 9. That is, the belt position determination member 68 is, as illustrated in FIG. 9, disposed at such a position that it does not come in contact with the fixing belt 610 when the fixing belt module 61 is mounted to the fixing device 60. Otherwise, the belt position determination member 68 is formed into such a shape that it does not come in contact with the fixing belt 610 when the fixing belt module 61 is attached to the fixing device 60.

The belt position determination member 68 includes a position determination portion 681, a cushion member 682, and a bracket 683. The cushion member 682 is provided for the position determination portion 681 so as to be disposed on top of the position determination portion 681 when the fixing belt module 61 stands vertically. The cushion member 682 of the position determination portion 681 is a buffer member for buffering impact caused by the contact of the fixing belt 610 when the fixing belt 610 is mounted. The bracket 683 is a member for fixing the position determination portion 681 to the inner plate 615.

In the belt position determination member 68, as illustrated in FIG. 8, in the case where a new fixing belt 610 is mounted while the fixing belt module 61 stands vertically, an edge portion of the new fixing belt 610 comes in contact with the cushion member 682 such that the new fixing belt 610 is placed at a predetermined position. Accordingly, the fixing belt 610 can be relatively easily replaced.

(Fixing Operation of Fixing Device)

Next, a fixing operation of the fixing device 60 will be described with reference to FIG. 3.

The recording medium P on which the primary transfer image is electrostatically transferred by the secondary transfer unit 20 of the image forming apparatus 1 is transported toward the contact portion N of the fixing device 60 by the transport belt 55 and the fixing entrance guide 56 (in the arrow direction F in FIG. 3). Here, the transport belt 55 transports the recording medium P to the fixing device 60 at a predetermined transport speed corresponding to the fixing speed of the fixing device 60.

In addition, the secondary transfer image, which is not yet fixed on the surface of the recording medium P that passes through the contact portion N, is fixed to the recording medium P by pressure and heat. Here, the recording medium P is heated to a predetermined fixing temperature while being transported at the predetermined fixing speed. Thereafter, the recording medium P is detached from the fixing belt 610 by the peeling pad 70 and discharged to the discharge unit (not shown) by a sheet ejection guide 71 and a sheet ejection roll 72.

(Replacement Operation of Fixing Belt)

Next, a replacement operation of the fixing belt 610 will be described with reference to the accompanying drawings.

When the image forming apparatus 1 is turned off, or the replacement mode for replacing the fixing belt 610 is selected, the pressure roll 621 of the pressure mechanism 62 is separated from the fixing roll 611 of the fixing belt module 61. In addition, as illustrated in FIG. 4, the lock mechanism 664 of the opening and closing mechanism 66 is released by the operator (not shown) to open the opening and closing frame 661.

When the opening and closing frame 661 is opened, the fixing roll 611 is detached from the notch 631 of the supporting frame 63 by the pulling portion 661*b* such that the fixing belt module 61 is pulled toward the opening and closing frame 661. In addition, when the opening and closing frame 661 is opened, as the extension roll 666 provided in the opening and closing frame 661 is moved along with the opening and closing frame 661, the tension of the fixing belt 610 is loosened. When the tension of the fixing belt 610 is loosened, the movement of the tension bracket 646 of the tension mechanism 64 is restricted, and thus the movement of the extension roll 612 is restricted, thereby allowing a state where the tension is not applied to the fixing belt 610.

Thereafter, when the handle 618 of the fixing belt module 61 is held by the operator and the shaft 616 of the fixing belt module 61 is detached from the concave portion (not shown) of the supporting frame 63, the fixing belt module 61 is thus detached from the fixing device 60. Then the fixing belt module 61 is placed lengthwise on a flat part such as floor. In addition, the fixing belt 610 mounted to the fixing belt module 61 is detached by the operator, and a new fixing belt 610 is mounted to the fixing belt module 61.

When the new fixing belt 610 is mounted, the new fixing belt 610 is disposed at the predetermined position by the belt position determination member 68. In addition, when the fixing belt 610 is replaced, as illustrated in FIG. 6, first, the fixing belt 610 may be removed, a cylindrical guide member 80 may be mounted to the fixing belt module 61, the new fixing belt 610 may be mounted, and, lastly, the guide member 80 may be detached therefrom.

Thereafter, the handle 618 of the fixing belt module 61 mounted to the new fixing belt 610 is held by the operator, and the shaft 616 of the fixing belt module 61 is fitted to the concave portion (not shown) of the supporting frame 63, thereby mounting the fixing belt module 61 to the fixing device 60. In addition, as illustrated in FIG. 5, when the opening and closing frame 661 is closed by the operator, the bearing 611*c* of the fixing roll 611 is fitted into the notch 631 of the supporting frame 63, and the closed state of the opening and closing frame 661 is maintained by the lock mechanism 664. When the opening and closing frame 661 is closed, tension is applied to the fixing belt 610 by the extension roll 666. Then, the tension of the fixing belt 610 is adjusted by the tension mechanism 64. As described above, the fixing belt module 61 is mounted to the fixing device 60.

Next, as illustrated in FIG. 9, the fixing belt 610 is in a state where it does not come in contact with the belt position determination member 68 since the fixing belt 610 is pushed by the extension roll 666. Therefore, the fixing belt 610 is moved to the predetermined position by the meandering prevention mechanism 65. In addition, the pressure roll 621 of the pressure mechanism 62 presses the fixing roll 611.

The invention can be used for a fixing device of a color printer, a FAX, a color copier, or an image forming apparatus having those functions.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments are chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. A belt device comprising:
- a belt;
- a driving unit that is provided inside the belt and drives the belt;
- a supporting unit that is provided inside the belt and supports the belt;
- a position determination member that is fixed to one end in an axial direction of the driving unit or the supporting unit and comes in contact with an edge portion of the belt in the case where the belt is mounted so as to determine a position of the belt;
- an opening and closing mechanism, which is rotated relative to the belt, to be opened and closed; and
- a tension applying unit that applies tension to the belt when the opening and closing mechanism is closed,
- wherein, when the tension is applied to the belt by the tension applying unit, contact between edge portions of the belt and the position determination member is released.

2. The belt device according to claim 1, further comprising:
- a placement member that is provided on a side where the position determination member is provided, aligning axial directions of the driving unit and the supporting unit with a direction of gravity.

3. The belt device according to claim 1, wherein the tension applying unit is a pushing unit that is provided in the opening and closing mechanism and pushes the belt from an outside of the belt.

4. A belt device comprising:
- a belt;
- a driving unit that is provided inside the belt and drives the belt;
- a supporting unit that is provided inside the belt and supports the belt;
- a position determination member that is fixed to one end in an axial direction of the driving unit or the supporting unit and comes in contact with an edge portion of the belt in the case where the belt is mounted so as to determine a position of the belt; and a placement member that is provided on a side where the position determination member is provided, aligning axial directions of the driving unit and the supporting unit with a direction of gravity.

* * * * *